(12) United States Patent
Miyatake et al.

(10) Patent No.: US 7,432,628 B2
(45) Date of Patent: Oct. 7, 2008

(54) GENERATOR AND METHOD OF MANUFACTURING SAME

(75) Inventors: Toshio Miyatake, Hitachi (JP); Juichi Enyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 11/270,616

(22) Filed: Nov. 10, 2005

(65) Prior Publication Data

US 2006/0097606 A1 May 11, 2006

(30) Foreign Application Priority Data

Nov. 11, 2004 (JP) .............................. 2004-327135

(51) Int. Cl.
*H02K 3/46* (2006.01)
(52) U.S. Cl. ...................................... 310/270; 310/214
(58) Field of Classification Search ................. 310/214, 310/216, 270, 260
See application file for complete search history.

(56) References Cited

U.S. PATENT DOCUMENTS

| | | | | |
|---|---|---|---|---|
| 4,275,324 A | * | 6/1981 | Flick | 310/270 |
| 5,174,011 A | * | 12/1992 | Weigelt | 29/598 |
| 5,430,340 A | * | 7/1995 | Shih et al. | 310/214 |
| 5,883,456 A | * | 3/1999 | Gardner et al. | 310/270 |
| 6,124,661 A | * | 9/2000 | Gardner | 310/218 |
| 6,864,617 B1 | * | 3/2005 | Wang et al. | 310/270 |

FOREIGN PATENT DOCUMENTS

| | | |
|---|---|---|
| JP | 6-98492 | 4/1994 |
| JP | 7-184338 | 7/1995 |
| JP | 8-205447 | 8/1996 |

* cited by examiner

*Primary Examiner*—Thanh Lam
(74) *Attorney, Agent, or Firm*—Mattingly, Stanger, Malur & Brundidge, P.C.

(57) ABSTRACT

A generator and a method of manufacturing the generator, which can suppress a lowering of tension of a bind ring caused by an initial deformation during assembly and changes with the lapse of time during long-term operation, and can prevent a lowering of the support function. The generator includes a coil assembled in a groove formed in an iron core of a rotor and a bind ring for fixing a coil end of the coil, which is projected outward of the iron core, to a coil support. A restraint member is disposed on at least one of opposite axial ends of the bind ring to restrain the relevant end from deforming.

7 Claims, 5 Drawing Sheets

GENERATOR AND METHOD OF MANUFACTURING SAME

BACKGROUND OF THE INVENTION

1. Field of the Invention

The present invention relates to a novel generator and a method of manufacturing the generator. More particularly, the present invention relates to a generator having a rotor coil end support suitable for a large-capacity generator, and a method of manufacturing the generator.

2. Description of the Related Art

Patent Document 1 (JP,A 8-205447) discloses a technique of forming a bind-underlying insulation over a rotor end portion of a generator by impregnating laminated insulating sheets, each of which comprises a polyimide film and a mica sheet bonded to each other, with an epoxy resin, and then forming a bind ring made of a nonmagnetic piano wire on the bind-underlying insulation. Also, Patent Document 2 (JP,A 7-184338) discloses a technique of forming a bind member made of chemical fibers in a tape-like shape over a rotor end portion of a generator. Further, Patent Document 3 (JP,A 6-98492) discloses a technique of forming a bind-underlying insulation made of a prepreg impregnated with a thermosetting resin, and then forming a bind ring on the bind-underlying insulation.

More specifically, the rotor end portion of the generator includes an iron core, a metallic support, a coil, etc. Because power is generated with the rotor rotating at a high speed during operation, large centrifugal forces are imposed on the iron core, the metallic support, the coil, etc. with the rotation. Therefore, stresses are loaded on the coil, whereupon the coil is deformed to bend outward in the radial direction. The coil is embedded in an insulator so as to resist the stresses. However, if the coil is deformed beyond the allowable strain or stress of the insulator, this leads to a possibility that the insulator is broken and a short-circuiting occurs between the coil and the iron core or a ground potential portion, such as the metallic support, thus resulting in damage of the rotor. In the worst case, the operation of the generator is disabled.

To cope with such a situation, as disclosed in Patent Documents 1-3, it is proposed so far to prevent the deformation of the coil by fitting the bind (ring) over the coil end portion while applying a tension to it so that the coil is firmly bound to the metallic support. The bind is formed of a metallic bind wire or a member prepared by impregnating non-metallic fibers with a setting resin and then hardening the resin.

The metallic bind wire is formed of a nonmagnetic piano wire or another suitable wire and is wound over the coil end portion with a strong tension applied so as to endure centrifugal forces generated based on the weight of the coil end portion and the rotation of the rotor and to be kept from loosening even under vibrations, etc.

In the case using the non-metallic fibers, the fibers are arrayed side by side to have a relatively large width and are impregnated with a setting resin into the form of a tape. This tape is wound over the coil end portion from the core side to the coil end in the axial direction of the generator while a strong tension is applied to the tape.

Because of the necessity of increasing the bind tension as the centrifugal force generated due to the rotation increases, however, the applied tension has been recently increased with an increase in output and size of the generator, and at the time of winding the bind wire or the tape to form the lowermost underlying layer, a bind winding machine is operated nearly at its maximum output in many cases. Application of such an increased load may give rise to the problem that, when the bind is successively wound in plural layers, lower layers are collapsed and cannot maintain a predetermined shape in the step of winding upper layers.

Further, the tension applied to the bind is gradually reduced with the lapse of time due to stress relaxation. In addition, the bind tension is also reduced with creep deformations of the coil fixedly bound by the bind, a dimension adjusting material, the bind itself, etc., which are all subjected to compressive loads.

If the bind tension is reduced in such a way, those coil end components are deformed to larger extents and the load imposed on the insulator supporting the coil is increased. This may increase deterioration with the lapse of time and shorten the life of the insulator. In spite of the design life of the insulator being not yet expired, the bind tension is so reduced as to allow slipping-off of the bind, thus resulting in a possibility that the rotor is immediately broken.

Particularly, in consideration of the centrifugal force increasing with a larger output capacity of the generator, a bind tape formed by impregnating nonmetallic fibers having high specific strength with a setting resin and hardening the impregnated fibers has been recently used in many cases. Because the stress relaxation and creep deformation of the bind using such a member are generally larger than those of the metallic bind, the above-mentioned problems become more serious.

SUMMARY OF THE INVENTION

An object of the present invention is to provide a generator and a method of manufacturing the generator, which can suppress a lowering of tension of a bind ring caused by an initial deformation during assembly and changes with the lapse of time during long-term operation, and which can prevent a lowering of the support function.

To achieve the above object, the present invention provides a generator including a coil assembled in a groove formed in an iron core of a rotor and a bind ring for fixing a coil end of the coil, which is projected outward of the iron core, to a coil support, wherein a restraint member is disposed on at least one of opposite axial ends of the bind ring to restrain the relevant end from deforming.

Thus, with the present invention, in order to suppress a lowering of tension of the bind ring caused by deformations during assembly and changes with the lapse of time, at least one end of the bind ring is restrained by a stopper, which serves as the restraint member, to prevent the bind ring from deforming starting from the end.

Preferably, the restraint member is disposed on at least one of an axial end surface of the bind ring and an outer surface of an axial end thereof. Also, the coil is formed in two stages comprising a bottom coil and an upper coil formed above the bottom coil, the coil end is formed in two stages including respective ends of the bottom coil and the upper coil, and the restraint member is disposed in at least one of the two stages of the coil end. More preferably, those features are combined with each other.

Preferably, the restraint member is made of a nonmagnetic metallic material or non-metallic material and is in the form of an annular ring. Also, the restraint member is formed of a bind tape having a narrower width than a member constituting the bind ring. Further, the restraint member is formed by additionally winding the member constituting the bind ring in a larger number of bind windings per unit length than that in a region of the bind ring. More preferably, those features are combined with each other.

Preferably, the bind ring is provided by winding a tape made of a prepreg, which is formed of resin fibers impregnated with a thermosetting resin, and hardening the tape under heating. Also, a dimension adjusting material made of a resin is laid between the coil support and the coil and between the coil and the bind ring for adjusting the radial height of the coil. Further, a disk-shaped coil end member is joined to respective ends of the bottom coil and the upper coil for electrical connection therebetween. More preferably, those features are combined with each other.

The present invention also provides a method of manufacturing a generator including a coil assembled in a groove formed in an iron core of a rotor and a bind ring for fixing a coil end of the coil, which is projected outward of the iron core, to a coil support, the method comprising the step of forming a restraint member for restraining at least one end of the bind ring from deforming at least before or after forming the bind ring.

Preferably, the method further comprises the step of forming the bind ring on at least one of opposite axial end surfaces of the bind ring after forming the restraint member for restraining at least one end of the bind ring from deforming. Also, the method further comprises the step of, after forming the bind ring, forming the restraint member for restraining at least one end of the bind ring from deforming on at least one of an axial end surface of the bind ring and an outer surface of an axial end thereof. More preferably, those features are combined with each other.

Preferably, the method further comprises the steps of forming the coil in two stages, forming the coil end in two stages, and disposing the restraint member in at least one of the two stages of the coil end. Also, the method further comprises the step of forming a dimension adjusting material made of a resin between the coil support and the coil and between the coil and the bind ring for adjusting the radial height of the coil. Further, the method further comprises the step of forming the restraint member with a bind tape having a narrower width than a member constituting the bind ring. More preferably, those features are combined with each other.

Preferably, the method further comprises the step of forming the bind ring by winding a tape made of a prepreg containing resin fibers over the coil at a high temperature under a tension, and then hardening the tape under heating. Also, the method further comprises the step of removing the restraint member after forming the bind ring. More preferably, those features are combined with each other.

In addition, the present invention provides a method of manufacturing a generator including a coil assembled in a groove formed in an iron core of a rotor and a bind ring for fixing a coil end of the coil, which is projected outward of the iron core, to a coil support, the method comprising the step of forming the bind ring by winding a tape made of a prepreg containing resin fibers over the coil at a high temperature under a tension, and then hardening the tape under heating.

Thus, according to the present invention, it is possible to provide the generator and the method of manufacturing the generator, which can suppress a lowering of tension of the bind ring caused by an initial deformation during assembly and changes with the lapse of time during long-term operation, and can prevent a lowering of the support function.

DESCRIPTION OF THE PREFERRED EMBODIMENTS

The best mode for carrying out the present invention will be described below in connection with embodiments in concrete form.

First Embodiment

Figure 1:
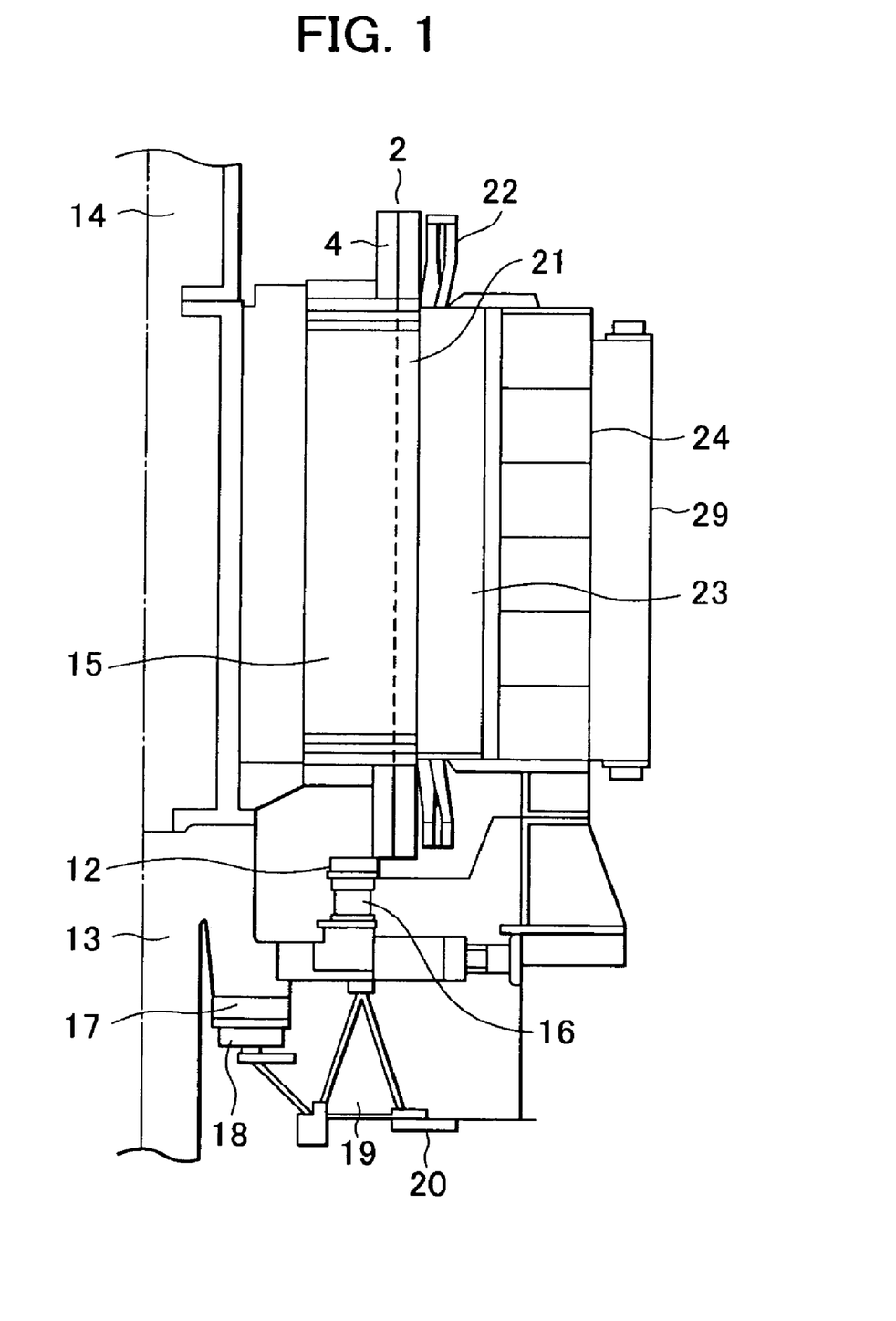
FIG. 1 is a sectional view showing an overall structure of a water-wheel generator according to a first embodiment of the present invention.

FIG. 1 is a sectional view showing an overall structure of a water-wheel generator according to a first embodiment of the present invention, the view showing only one side of a generator axis. As shown in FIG. 1, a stator comprises a stator coil 22, a stator core 23, and a stator frame 24. A rotor 1 (see FIG. 3) comprises a rotor coil 21, a metallic (coil) support 4, a bind ring 7 (see FIG. 3), and a rotor rim core 15. Further, the generator comprises a brake ring 12, a lower shaft 13, an upper shaft 14, a jack 16 serving also as a brake, a thrust bearing 17, a spring 18, a lower bracket 19, and a lower bracket case 20.

Figure 2:
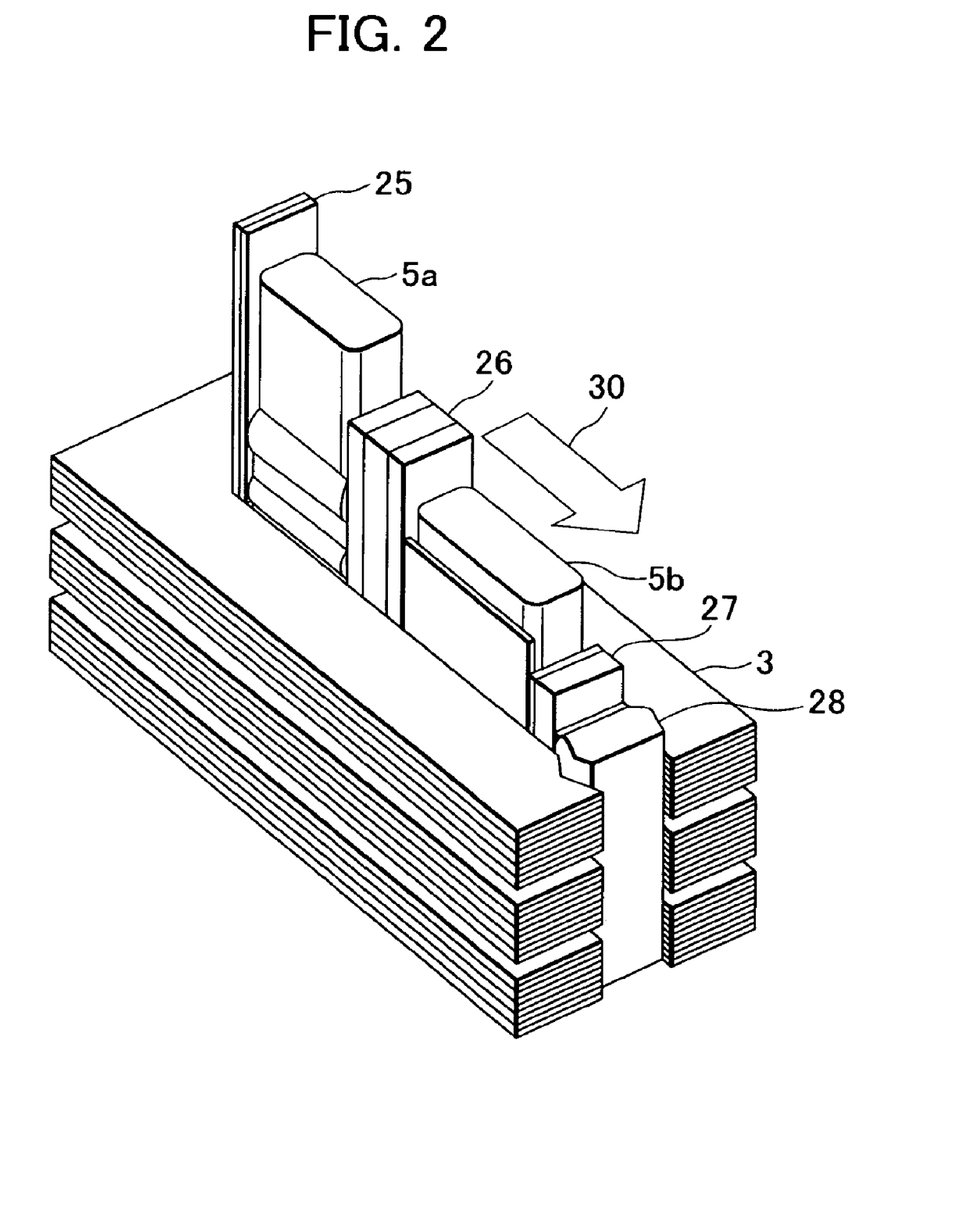
FIG. 2 is a perspective view showing a state where a bottom coil and an upper coil are assembled into a rotor shown in FIG. 1.

FIG. 2 is a perspective view showing a state where a bottom coil and an upper coil are assembled into the rotor. As shown in FIG. 2, the rotor 1 further comprises iron cores 3 made up of a predetermined number of laminated steel plates and constituting the rotary rim core 15, and a bottom coil 5a and an upper coil 5b successively disposed in each of many grooves which are formed parallel to the axial direction of the rotary rim core 15 at angular intervals over an entire circumferential surface thereof. In addition, a bottom sheet 25, an intermediate layer 26, an inner wedge 27, and an outer wedge 28 are inserted in each groove in this order. The bottom coil 5a and the upper coil 5b are each formed of a plate-like or wire-bundled conductor having a relatively large width in the radial direction and are prevented by the inner and outer wedges 27, 28 from slipping off in a centrifugal direction 30. Moreover, the bottom coil 5a and the upper coil 5b are held fixed by the bind ring 7 in each coil end portion (coil end 2) as described below.

Figure 3:
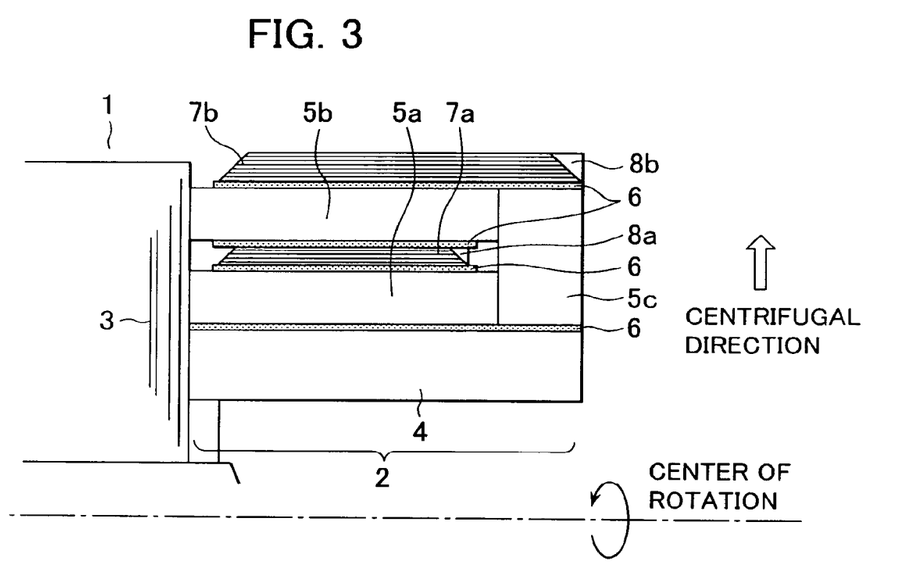
FIG. 3 is a sectional view of a coil end portion of the rotor in the generator according to the first embodiment of the present invention.

FIG. 3 is a sectional view of the coil end portion of the rotor in the generator according to the first embodiment of the present invention. As shown in FIG. 3, the coil end 2 of the rotor 1 is constituted by the iron cores 3, the metallic support 4, the coils 5a and 5b, etc. During operation, because the rotor 1 is rotated at a high speed to generate electric power, large centrifugal forces are imposed on the iron cores 3, the metallic support 4, the coils 5a, 5b, etc. with the rotation. Accordingly, stresses are loaded on the coils 5a, 5b, whereupon the coils 5a, 5b are deformed to bend outward in the radial direction. The coils 5a, 5b are each embedded in an insulator so as to resist the stresses. However, if the coils are deformed beyond the allowable strains or stresses of the insulators, this leads to a possibility that the insulators are broken and a short-circuiting occurs between the coils 5a, 5b and the iron cores 3 or a ground potential portion, such as the metallic support 4, thus resulting in damage of the rotor 1. In the worst case, the operation of the generator is disabled.

To cope with such a situation, a lower bind ring 7a and an upper bind ring 7b are fixedly held over the coil end 2 while a tension is applied to those rings so that the coils 5a, 5b are firmly bound to the metallic support 4, thereby preventing deformations of the coils 5a, 5b. The lower bind ring 7a and the upper bind ring 7b are each formed of a metallic bind ring, a metallic bind wire, or a member prepared by impregnating non-metallic fibers with a setting resin and then hardening the resin.

The metallic bind wire is formed of a nonmagnetic piano wire or another suitable wire and is wound over the coil end with a strong tension applied so as to endure centrifugal forces generated based on the weight of the coil end 2 and the rotation of the rotor 1 and to be kept from loosening even under vibrations, etc.

In the case using the non-metallic fibers, aramid fibers are arrayed side by side to have a predetermined relatively large width and are impregnated with a thermosetting resin into the form of a tape. This tape is wound over the coil end from the core side to the coil extreme end in the axial direction of the generator while a strong tension is applied to the tape.

Because of the necessity of increasing the bind tension as the centrifugal force generated due to the rotation increases, the applied tension has been recently increased with an increase in output and size of the generator, and at the time of winding the bind wire or the tape to form the lowermost underlying layer, a bind winding machine is operated nearly at its maximum output in many cases. In order to cope with an application of such an increased load, when the binds are each successively wound in plural layers, stoppers 8a, 8b serving as restraint members are disposed at respective ends of the lower bind ring 7a and the upper bind ring 7b. With the provision of the stoppers 8a, 8b, lower layers of each wound bind ring are prevented from being collapsed in the step of winding upper layers thereof.

A method of supporting windings of the rotor coils of the generator will be described below. The lower bind ring 7a and the upper bind ring 7b are each formed of a non-metallic bind tape or a nonmagnetic metallic wire. In this embodiment, the case using the bind tape is described in detail.

In a first step, the bottom coil 5a is inserted in each of the grooves formed in the rotary rim core 15. More specifically, a portion of the bottom coil 5a corresponding to the coil end 2 is disposed on the metallic support 4 mounted over the rotor 1 with a dimension adjusting material 6 interposed between the bottom coil 5a and the metallic support 4. The dimension adjusting material 6 is impregnated with a thermosetting epoxy resin to accommodate variations in the radial height of the coil, thereby adjusting the radial height of the coil. Then, the dimension adjusting material 6 is laid on the bottom coil 5a again so that an upper (as viewed in the FIG. 3) surface of the bottom coil 5a is flattened and the lower bind ring 7a can be more easily wound. Thereafter, the dimension adjusting material 6 is hardened under heating.

In a second step, before winding the bind tape, the stopper 8a serving as the restraint member is disposed on at least one end of the lower bind ring 7a. The provision of the stopper 8a prevents layers of the bind tape, which constitutes the lower bind ring 7a, from being displaced and hence prevents the lower bind ring 7a from being entirely collapsed during the operation of winding the bind tape. Then, on the bottom coil 5a, the non-metallic bind tape is wound in plural layers to constitute the lower bind ring 7a. In order to reduce the influence of initial stress relaxation caused during the winding operation, a tension is set to a larger value at a lower layer and is gradually reduced so that a predetermined tension is obtained at a final layer. In the same layer, the bind tape is wound with a uniform tension. The stopper 8a can be formed of a prepreg prepared by arraying non-metallic fibers side by side to have a predetermined relatively large width, impregnating the arrayed fibers with a setting resin into the form of a tape, and hardening the tape under heating in advance, or a prepreg prepared in a similar manner and hardened under heating after winding it.

The lower bind ring 7a is formed of a prepreg prepared by arraying non-metallic fibers side by side to have a predetermined relatively large width, and impregnating the arrayed fibers with a setting resin into the form of a tape, the prepreg being hardened under heating after winding it. The tape-like prepreg is wound in a state where it is heated to a predetermined temperature and softened, while a tension is applied. In the winding operation, the excessive resin is moved. With the removal of the excessive resin, the lower bind ring 7a is formed at a thin thickness and sufficiently high strength. After the winding operation, the lower bind ring 7a is hardened under heating.

Also, when the lower bind ring 7a is compressed in subsequent steps of disposing the upper coil 5b and applying a tension to the upper bind ring 7b, the lower bind ring 7a is likewise restrained from deforming at its side by the stopper 8a (on the inner peripheral side) and can be prevented from being collapsed.

In a third step, as in the first step, the dimension adjusting material 6 is laid on an upper (as viewed in the FIG. 3) surface of the lower bind ring 7a so that the upper surface of the lower bind ring 7a has a uniform height. Thereafter, the lower bind ring 7a and the dimension adjusting material 6 are hardened under heating.

In a fourth step, the upper coil 5b is disposed on the lower bind ring 7a formed over the bottom coil 5a. As with the bottom coil 5a, the dimension adjusting material 6 is laid on and under the upper coil 5b. At this time, the dimension adjusting material 6 laid under the upper coil 5b may be the same as that laid on the upper surface of the lower bind ring 7a. Further, to increase the distance between the upper and bottom coils and to enhance the insulation capability, an insulation spacer (not shown) may be disposed between the upper coil 5b and the lower bind ring 7a. Such an insulation spacer is preferably made of FRP (Fiber Reinforced Plastic) that is insulating and has high specific strength, but it may be made of another suitable material having similar functions.

In a fifth step, respective ends of the bottom coil 5a and the upper coil 5b are connected to each other through a coil end member 5c by brazing, welding or the like, thereby establishing electrical connection between the bottom coil 5a and the upper coil 5b. Then, the coil end member 5c is insulated to have predetermined dielectric strength by winding an insulating tape or fitting a cap-like member over it. Thereafter, the dimension adjusting materials 6 laid on and under the upper coil 5b are heated for hardening.

In a final sixth step, the bind tape is wound over the upper coil 5b under a predetermined tension by using the prepreg while removing the excessive resin in a similar manner to that described above, thereby constituting the upper bind ring 7b that serves as a member for binding the coils. Before forming the upper bind ring 7b, as in the second step, the stopper 8b (on the outer peripheral side) is disposed on at least one end of the upper bind ring 7b to prevent the upper bind ring 7b from being collapsed and to keep the initial tension from being reduced below a predetermined value. Then, the coil end 2 including the upper bind ring 7b is entirely heated for hardening, and the assembly of the coil end 2 is completed by drying the whole of the coil end.

If the stopper size is too large when the stopper is formed as a single member, the stopper may be divided into parts in the radial direction and combined into an integral unit when used. This modification is advantageous in improving workability.

The stopper is preferably made of a non-metallic material (e.g., a piano wire) that has high rigidity and is less affected by temperature. Alternatively, in order to reduce the influence of the stopper itself upon the magnitude of centrifugal forces, an insulating non-metallic material (e.g., FRP (Fiber Reinforced Plastic) having high specific strength) may be used instead.

Thus, with this embodiment, by adding the step of disposing the stopper 8 to avoid the wound bind ring layers from deforming starting from their ends during the assembly, it is possible to prevent the lower bind ring 7a and the upper bind ring 7b from being collapsed and to keep the initial tension from being reduced below a predetermined value. As a result, the bind rings can be assembled in shapes as per design so that stresses, strains, etc. are generated in the coil insulation as per design conditions. Hence, the service life of the generator can be estimated with higher accuracy and safer operation can be realized.

Further, during the operation, since the bind rings are restrained from deforming at their sides, creep deformation of the lower bind ring 7a caused by compression and stress relaxation of respective bind tensions of the lower bind ring 7a and the upper bind ring 7b can be both suppressed in comparison with the case using no stoppers.

Even when nonmagnetic metallic wires are used as the lower bind ring 7a and the upper bind ring 7b, the intended functions can be obtained by carrying out this embodiment through similar steps to those described above.

For example, in the case using, as the bind rings, nonmagnetic metallic wires which are susceptible to small changes with the lapse of time, when it is desired to keep the total weight as small as possible, the shape holding effect during the assembly can also be obtained by using the stoppers just in the step of assembly as described above, and removing a part or the whole of the stoppers before the start of the operation.

Figure 4A:
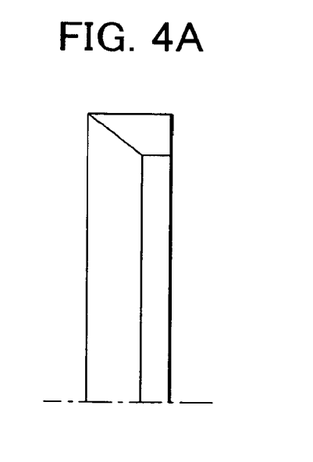
FIGS. 4A-4C are each a sectional view of a stopper in the first embodiment of the present invention.
Figure 4B:
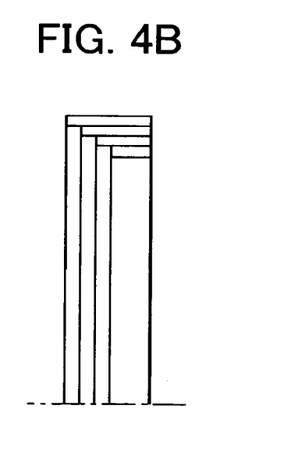
Figure 4C:
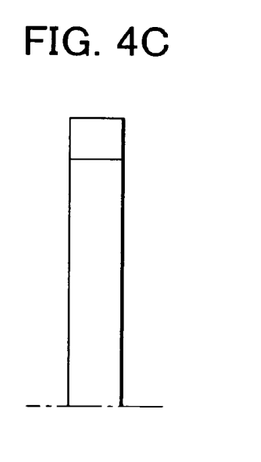

FIGS. 4A-4C are each a sectional view of the stopper serving as the restraint member in this embodiment. In FIG. 4A, the stopper is formed as an annular ring-like member having a trapezoidal cross-section in match with the sectional shape of the end of the lower bind ring 7a or the upper bind ring 7b. Stated another way, the stopper is formed to have an inclined surface extending along a slope at the end of the bind ring. Such a sectional shape of the stopper is advantageous in that the bind ring is able to more easily maintain the stable shape because it has a wider lower surface than an upper surface. FIG. 4B is a sectional view showing another example of the stopper serving as the restraint member. In FIG. 4B, the stopper is formed as a plurality of annular ring-like members differing in both diameter and sectional width so as to provide a shape of stairs when combined together, for the purpose of making the winding operation easier in consideration of a situation where the stopper tends to interfere with the winding of the bind tape when the bind tape is wound in plural layers. The tape winding operation is facilitated by adding the stopper one by one in match with the stacked layers of the wound bind tape. FIG. 4C is a sectional view showing still another example of the stopper serving as the restraint member. In FIG. 4C, the stopper is formed to have a rectangular cross-section such that each layer of the bind ring can be wound with a similar operation.

According to this embodiment, as described above, a generator and a method of manufacturing the generator are provided which can restrain the bind ring for supporting the coil end 2 from deforming at its end while minimizing an increase in the number of necessary constituent members, and which can suppress a lowering of tension of the bind ring caused by an initial deformation during the assembly and changes with the lapse of time during long-term operation. Further, loads imposed on the coil, etc. can be reduced and high reliability can be ensured for a long term.

Also, according to this embodiment, a lowering of the tension applied to each bind ring and reduced due to stress relaxation with the lapse of time is small. In addition, since the bottom coil 5a, the upper coil 5b, the dimension adjusting material 6, and the lower bind ring 7a, which are held fixed by the bind ring(s), are put under compressive loads, creep deformations of those members are reduced and a lowering of tension of the bind ring is suppressed. Stated another way, because of a less lowering of tension of the bind ring and smaller deformations of the members at the coil end, loads imposed on the insulators including the bottom coil 5a and the upper coil 5b are small. As a result, deterioration with the lapse of time can be reduced and a shortening of the life of the insulators can be suppressed.

Particularly, when a bind tape formed by impregnating nonmetallic fibers having high specific strength with a setting resin and hardening the impregnated fibers is used in consideration of the centrifugal force that has been recently increased with a larger output capacity of the generator, the stress relaxation and the creep deformation of such a bind tape are generally somewhat larger than those of the metallic bind tape. Even in that case, the creep deformation can be kept small.

Second Embodiment

Figure 5:
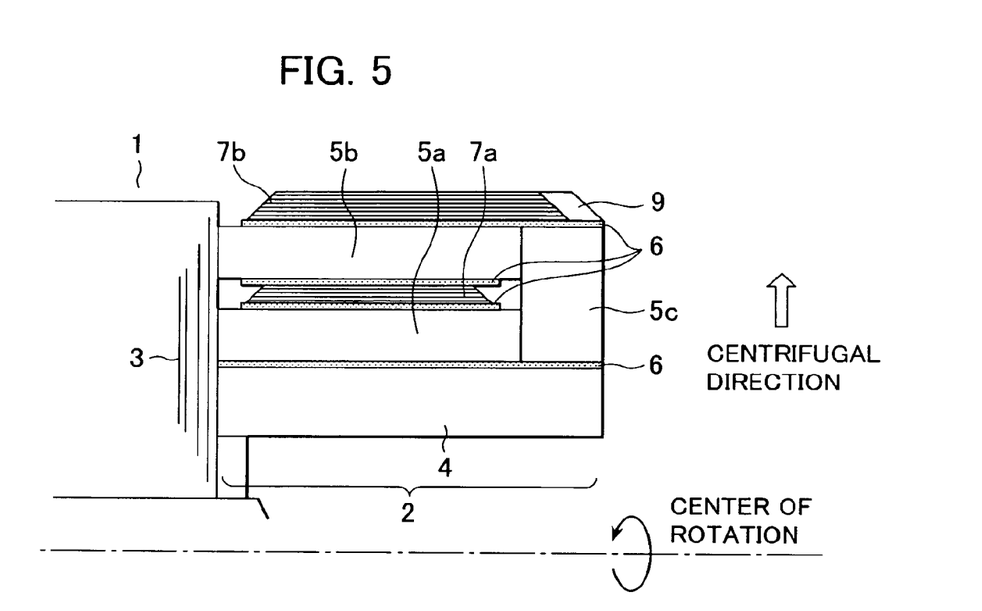
FIG. 5 is a sectional view of a coil end portion of the rotor in the generator according to a second embodiment of the present invention.

FIG. 5 is a sectional view of a coil end portion of the rotor in the generator according to a second embodiment of the present invention. In this embodiment, to restrain the upper bind ring 7b from deforming at its end, the upper bind ring 7b is formed to have in itself the function of a stopper serving as a restraint member.

As in the first embodiment, this second embodiment uses a bind tape made of a prepreg that is hardened under heating after winding it. When forming the upper bind ring 7b, the bind tape is first wound at a predetermined temperature until a position covering a part of the coil end member 5c. Then, on the remaining part of the coil end member 5c, an end bind ring 9 is formed to serve as a stopper by using a tape having a narrower width than the usual bind tape. Even in the case winding the bind tape while the winding machine is operated near its maximum output, the bind tape can be wound under an increased tension without changing the output of the winding machine. The load imposed on the coil end member 5c is increased with application of such a higher tension. However, since the coil end member 5c does not include the lower bind ring 7a and a portion corresponding to the lower bind ring 7a is occupied with a solid conductor, that portion has high rigidity and there is no fear that a deformation of the coil end member 5c becomes too large even when the higher tension is applied. Also, because of the coil end member 5c being insulated after connecting the bottom coil 5a and the upper coil 5b to each other, even when the coil end member 5c is required to have higher mechanical strength and dielectric strength than the other portions, such a requirement can be easily met, for example, by increasing the number of wound layers of an insulating tape.

If the winding machine has an allowance in capability and can easily increase a tension, a similar advantage can also be obtained by winding a bind tape having the same width as the bind tape wound over the upper coil 5*b* in the ordinary case while applying a higher tension only when the bind tape is wound over the coil end member 5*c*. This modification eliminates the need of replacing the bind tape and is therefore advantageous in allowing the operation to be performed with higher efficiency.

Further, if the bottom coil 5*a* and the upper coil 5*b* have sufficient mechanical strength and dielectric strength required at the subsequent time of establishing the coil insulation, a higher effect can be expected by winding the end bind ring 9 at each of both ends of the lower bind ring 7*a* and the opposite end of the upper bind ring 7*b* on the iron core side. By providing the stoppers 8*a*, 8*b* as in the first embodiment when the lower bind ring 7*a*, the upper bind ring 7*b* and the end bind ring 9 are wound, a synergistic effect can be expected without causing interference. This means that the combined use of the stoppers 8*a*, 8*b* is more preferable.

In addition, by providing the stoppers 8*a*, 8*b* with intent just to prevent the layers of the bind rings from being collapsed during the assembly and then removing the stoppers 8*a*, 8*b* after the assembly, the weight of the coil end is not increased and an increase of the load is avoided.

According to this second embodiment, as in the first embodiment, a generator is provided which can restrain the bind ring from deforming at its end while minimizing an increase in the number of necessary constituent members, and which can suppress a lowering of tension of the bind ring caused by an initial deformation during the assembly and changes with the lapse of time during long-term operation, whereby high reliability can be ensured for a long term.

Third Embodiment

Figure 6:
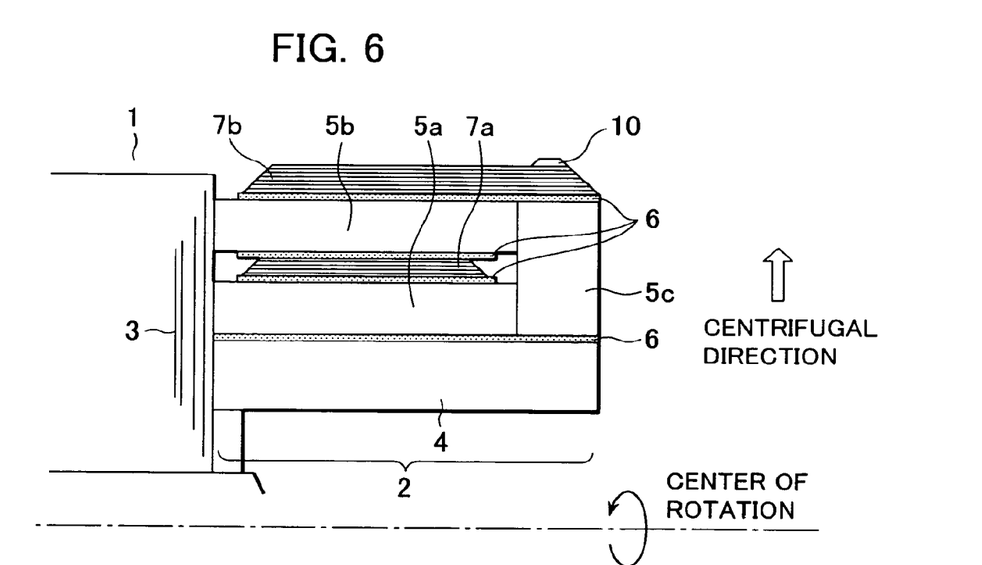
FIG. 6 is a sectional view of a coil end portion of the rotor in the generator according to a third embodiment of the present invention.

FIG. 6 is a sectional view of a coil end portion of the rotor in the generator according to a third embodiment of the present invention. As with the intent in FIG. 5, to restrain the upper bind ring 7*b* from deforming at its end, the upper bind ring 7*b* in this embodiment is formed to have in itself the function of a stopper serving as a restraint member. More specifically, in this third embodiment, a bind tape made of the prepreg is wound until the coil end member 5*c* in a similar manner to that in the second embodiment described above, thereby constituting the upper bind ring 7*b*. Then, an additionally wound bind ring 10 is provided by additionally winding the bind tape over a portion of the upper bind ring 7*b*, which corresponds to an outermost periphery of the coil end member 5*c*. More specifically, when providing the additionally wound bind ring 10, the upper bind ring 7*b* is formed and hardened under heating beforehand. Then, the additionally wound bind ring 10 is wound over a portion of the upper bind ring 7*b* corresponding to the coil end member 5*c* while the tension of the additionally wound bind ring 10 is set to be higher than that set in winding the outermost layer of the upper bind ring 7*b* as in the case winding the innermost layer of the upper bind ring 7*b*.

Further, if the bottom coil 5*a* and the upper coil 5*b* have sufficient mechanical strength and dielectric strength required at the subsequent time of establishing the coil insulation, a higher effect can be expected by winding the additionally wound bind ring 10 at the opposite end of the upper bind ring 7*b* on the iron core side. By providing the stoppers 8*a*, 8*b* as in the first embodiment when the bind rings 7*a*, 7*b* and the additionally wound bind ring 10 are wound, a synergistic effect can be expected without causing interference, thus resulting in even higher effect.

According to this third embodiment, as in the above-described embodiments, a generator is provided which can suppress a lowering of tension of the bind ring caused by an initial deformation during the assembly and changes with the lapse of time during long-term operation, and which can ensure high reliability.

Fourth Embodiment

Figure 7:
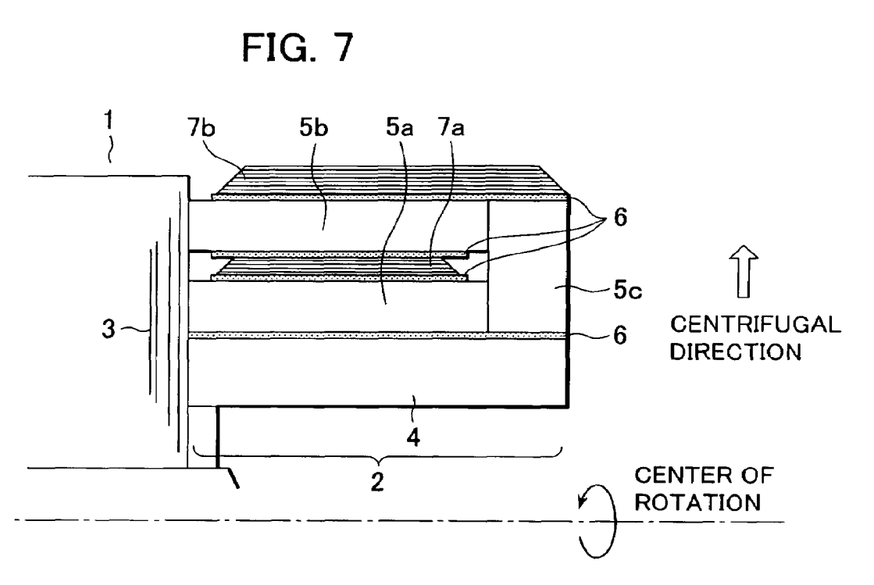
FIG. 7 is a sectional view of a coil end portion of the rotor in the generator according to a fourth embodiment of the present invention.

FIG. 7 is a sectional view of a coil end portion of the rotor in the generator according to a fourth embodiment of the present invention. As shown in FIG. 7, the coil end 2 of the rotor 1 is constituted by the iron cores 3, the metallic (coil) support 4, the bottom coil 5*a*, the upper coil 5*b*, etc. During operation, because the rotor 1 is rotated at a high speed to generate electric power, large centrifugal forces are imposed on the iron cores 3, the metallic support 4, the bottom coil 5*a*, the upper coil 5*b*, etc. with the rotation. Accordingly, stresses are loaded on the bottom coil 5*a* and the upper coil 5*b*, whereupon the coils 5*a*, 5*b* are deformed to bend outward in the radial direction. The bottom and upper coil 5*a*, 5*b* are embedded in respective insulators so as to resist the stresses, but they are susceptible to deformations. If the coils are deformed beyond the allowable strains or stresses of the insulators, this leads to a possibility that the insulators are broken and a short-circuiting occurs between the bottom and upper coils 5*a*, 5*b* and the iron cores 3 or a ground potential portion, such as the metallic support 4, thus resulting in damage of the rotor 1. In the worst case, the operation of the generator is disabled.

To cope with such a situation, the lower bind ring 7*a* and the upper bind ring 7*b* are fixedly held over the coil end 2 using the bind tape prepared by impregnating non-metallic fibers with a setting resin, as described in the first embodiment, while applying a tension to those rings so that the bottom and upper coils 5*a*, 5*b* are firmly bound to the metallic support 4 with hardening of the bind tape, thereby preventing deformations of the bottom and upper coils 5*a*, 5*b*. At this time, in order to reduce the influence of initial stress relaxation caused during the winding operation, a tension is set to a larger value at a lower layer and is gradually reduced so that a predetermined tension is obtained at a final layer. In the same layer, the bind tape is wound with a uniform tension.

A method of supporting windings of the rotor coils of the generator will be described below. As shown in FIG. 7, the bottom coil 5*a* is inserted in each of the grooves formed in the rotary rim core 15 of the rotor 1 and is disposed on the metallic support 4. The dimension adjusting material 6 prepared by bundling fibers into a sheet and impregnating the sheet with a setting epoxy resin is laid on the bottom coil 5*a* to accommodate variations in the radial height of the coil so that the entire coil has the same radial height. Then, on the bottom coil 5*a*, the bind tape made of a prepreg is wound at a predetermined temperature under a predetermined tension while removing the excessive resin in a similar manner to that in the first embodiment, thereby constituting the lower bind ring 7*a*. In the winding operation, since the bind tape is wound while removing the softened excessive resin, the lower bind ring 7*a* is formed at a thin thickness and sufficiently high strength as a result of removing the excessive resin. After the winding operation, the lower bind ring 7*a* is hardened under heating.

Then, the dimension adjusting material 6 is laid on an upper (as viewed in the FIG. 7) surface of the lower bind ring 7*a* so that the upper surface of the lower bind ring 7*a* has a uniform height. Thereafter, the upper coil 5*b* is disposed on the lower bind ring 7*a*. As with the bottom coil 5*a*, the dimension adjusting material 6 is laid on and under the upper coil 5*b*. At this time, the dimension adjusting material 6 laid under the upper coil 5*b* may be the same as that laid on the upper surface of the lower bind ring 7*a*.

After laying the dimension adjusting material 6 on the upper coil 5*b*, the coil end member 5*c* is jointed to respective ends of the bottom coil 5*a* and the upper coil 5*b* by brazing, welding or the like for electrical connection between both the coils. Then, the coil end member 5*c* is insulated to have predetermined dielectric strength, for example, by winding an insulating tape.

Finally, the bind tape is wound over the upper coil 5*b* at a predetermined temperature under a predetermined tension by using the prepreg while removing the softened excessive resin in the winding operation in a similar manner to that described above. Thus, the upper bind ring 7*b* is formed at a thin thickness and sufficiently high strength as a result of removing the excessive resin. After the winding operation, the upper bind ring 7*b* is hardened under heating.

As described above, in consideration of the centrifugal force increasing with a larger output capacity of the generator, a bind tape formed by impregnating nonmetallic fibers having high specific strength with a setting resin and hardening the impregnated fibers has been used recently, but the stress relaxation and the creep deformation of such a bind tape are generally somewhat larger than those of the metallic bind tape. On the other hand, according to this embodiment, a thin and sufficiently strong non-metallic bind tape is obtained. Hence, as in the above-described embodiments, this fourth embodiment can also provide a generator which can suppress a lowering of tension of the bind ring caused by an initial deformation during the assembly and changes with the lapse of time during long-term operation, and which can ensure high reliability.

What is claimed is:

1. A generator including a coil assembled in a groove formed in an iron core of a rotor and a bind ring for fixing a coil end of said coil, which is projected outward of said iron core, to a coil support, wherein a restraint member is disposed on at least one of opposite axial ends of said bind ring to restrain the relevant end from deforming, wherein said restraint member is formed of a bind tape having a narrower width than a member constituting said bind ring, and wherein a dimension adjusting material made of a resin is laid between said coil support and said coil and between said coil and said bind ring for adjusting the radial height of said coil.

2. The generator according to claim 1, wherein said restraint member is disposed on at least one of an axial end surface of said bind ring and an outer surface of an axial end thereof.

3. The generator according to claim 1, wherein said coil is formed in two stages comprising a bottom coil and an upper coil formed above said bottom coil, said coil end is formed in two stages including respective ends of said bottom coil and said upper coil, and said restraint member is disposed in at least one of the two stages of said coil end.

4. The generator according to claim 1, wherein said restraint member is made of a nonmagnetic metallic material or non-metallic material and is in the form of an annular ring.

5. The generator according to claim 1, wherein said restraint member is formed by additionally winding a member constituting said bind ring in a larger number of bind windings per unit length than that in a region of said bind ring.

6. The generator according to claim 1, wherein said bind ring is provided by winding a tape made of a prepreg, which is formed of resin fibers impregnated with a thermosetting resin, and hardening the tape under heating.

7. The generator according to claim 3, wherein a disk-shaped coil end member is joined to respective ends of said bottom coil and said upper coil for electrical connection therebetween.

* * * * *